United States Patent
Tanaka

(10) Patent No.: US 9,838,628 B2
(45) Date of Patent: Dec. 5, 2017

(54) DETECTING QUANTITIES BEYOND SENSOR SATURATION

(71) Applicants: SONY CORPORATION, Tokyo (JP); Sony Pictures Entertainment Inc., Culver City, CA (US)

(72) Inventor: Kazunori Tanaka, Irvine, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 15/072,129

(22) Filed: Mar. 16, 2016

(65) Prior Publication Data

US 2017/0272672 A1 Sep. 21, 2017

(51) Int. Cl.
*H04N 5/235* (2006.01)
*H04N 5/369* (2011.01)
*H04N 5/355* (2011.01)
*H04N 5/372* (2011.01)
*H04N 5/374* (2011.01)

(52) U.S. Cl.
CPC ......... *H04N 5/3696* (2013.01); *H04N 5/2351* (2013.01); *H04N 5/2355* (2013.01); *H04N 5/355* (2013.01); *H04N 5/372* (2013.01); *H04N 5/374* (2013.01)

(58) Field of Classification Search
CPC ............. H01L 27/14609; H01L 27/307; H01L 27/14603; H04N 5/374; H04N 5/37452; H04N 5/3745; G01J 3/2803; G01T 1/2928
See application file for complete search history.

(56) References Cited

U.S. PATENT DOCUMENTS

| | | | |
|---|---|---|---|
| 6,069,377 A | 5/2000 | Prentice et al. | |
| 8,508,656 B2 | 8/2013 | Varillon | |
| 2007/0131991 A1* | 6/2007 | Sugawa | H01L 27/14603 257/292 |
| 2009/0251580 A1* | 10/2009 | Schemmann | H04N 5/343 348/308 |
| 2010/0165135 A1* | 7/2010 | Kalevo | H04N 5/2351 348/221.1 |
| 2011/0084322 A1* | 4/2011 | Kang | H01L 27/1461 257/292 |
| 2015/0054992 A1 | 2/2015 | Luo et al. | |

* cited by examiner

*Primary Examiner* — Trung Diep
(74) *Attorney, Agent, or Firm* — Procopio, Cory, Hargreaves & Savitch LLP

(57) ABSTRACT

Capturing an image including: receiving an exposure time for an image sensor; measuring time to saturation for each sensel of a plurality of sensels of the image sensor; and calculating a number of electrons that would have been collected by each sensel with unlimited storage capacity using the time to saturation, the exposure time, and an electron collection capacity of a storage unit of each sensel. Key words include sensor saturation and high-dynamic range.

24 Claims, 3 Drawing Sheets

DETECTING QUANTITIES BEYOND SENSOR SATURATION

BACKGROUND

Field of the Disclosure

The present disclosure relates to sensors, and more specifically, to high-dynamic range sensors.

Background

An imaging system depends on an image sensor to generate an electronic representation of a visual image. Examples of image sensors include charge coupled device (CCD) image sensors and active pixel sensor (APS) devices. Typically, these images sensors include a plurality of light sensitive elements (sensels) arranged in a regular pattern of rows and columns. The signal generated by each sensel represents the amount of light incident upon the area corresponding to that sensel.

The dynamic range of these image sensors is typically limited by the amount of charge that can be collected and held for a given sensel. Thus, if the incident light is very bright and creates more electrons than can be held by that sensel, the light represented by those excess electrons is lost. For example, a modern image sensor, limited by characteristics such as electron capacity and electron readout noise, can detect about 14 stops of dynamic range for each sensel (i.e., it takes 14 doublings of the smallest recordable value to reach saturation).

Accordingly, an image sensor that can provide a wider dynamic range than the dynamic range provided by the conventional image sensor is desirable. For example, when capturing scenes that include drastic changes in brightness, if the exposure is made to ensure there is enough signal in the dark areas, the areas with stronger light will saturate the sensels, and the actual light radiance for those saturated elements cannot be obtained. Accordingly, sensors with higher dynamic range are needed for capturing such scenes.

SUMMARY

The present disclosure provides for enabling an image sensor to measure quantities of light that are greater than the typical capabilities of that sensor.

In one implementation, a method of capturing an image is disclosed. The method includes: receiving an exposure time for an image sensor; measuring time to saturation for each sensel of a plurality of sensels of the image sensor; and calculating a number of electrons that would have been collected by each sensel with unlimited storage capacity using the time to saturation, the exposure time, and an electron collection capacity of a storage unit of each sensel.

In another implementation, a sensor system is disclosed. The sensor system includes: an image sensor to sense an image, the image sensor including a plurality of sensels; a timer including a plurality of timing elements, each timing element coupled to a corresponding sensel of the plurality of sensels, wherein each timing element measures time to saturation of the corresponding sensel to predict a number of electrons that would have been collected by the corresponding sensel.

In another implementation, an image capturing device is disclosed. The image capturing device includes: an imaging stage; an image sensor coupled to the imaging stage, the image sensor including a plurality of sensels; a timer including a plurality of timing elements, each timing element coupled to a corresponding sensel of the plurality of sensels; and a processor coupled to the timer, the processor configured to receive signal from each timing element to measure time to saturation of the corresponding sensel and calculate a number of electrons collected by the corresponding sensel.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

To obtain a high dynamic range for an image sensor, several implementations as disclosed herein enable the image sensor to measure quantities that are greater than the typical capabilities of that sensor. After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

Figure 1:
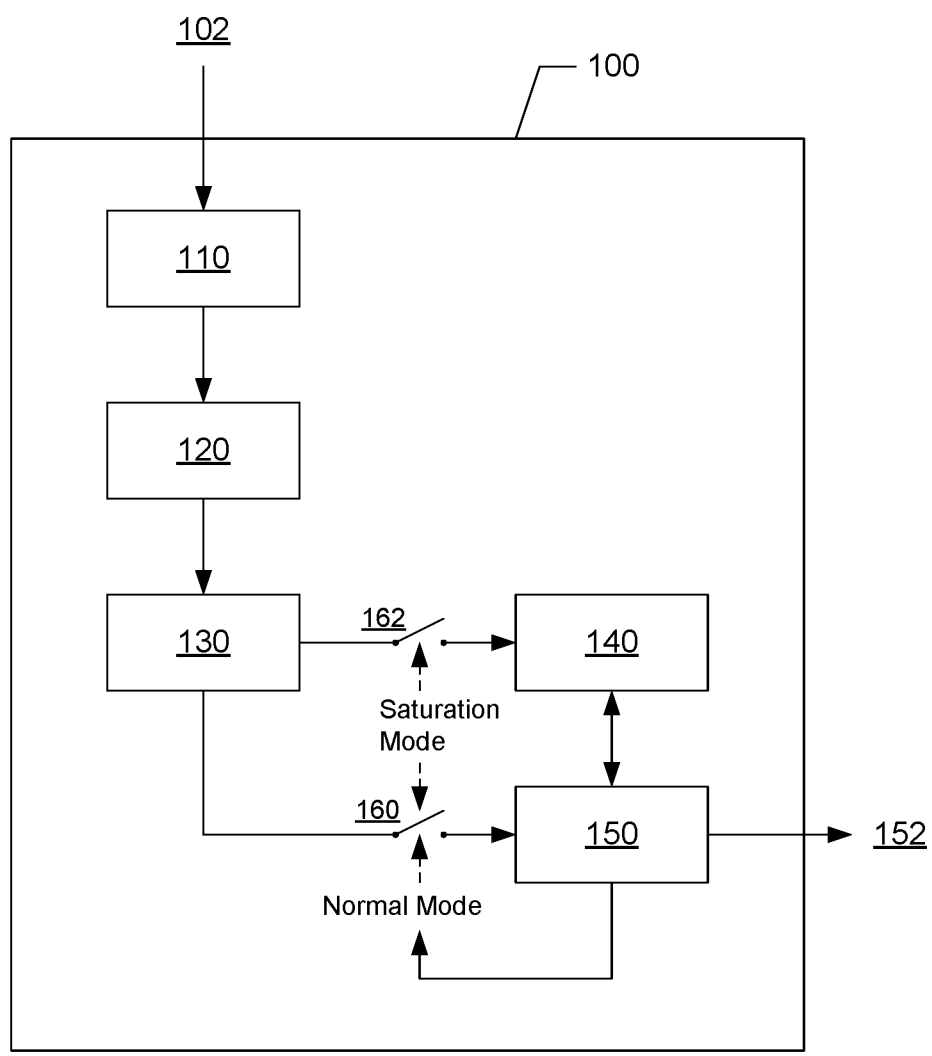
FIG. 1 is a functional block diagram illustrating an image capturing device in accordance with one implementation of the present disclosure.

FIG. 1 is a functional block diagram illustrating an image capturing device 100 in accordance with one implementation of the present disclosure. In one implementation, the image capturing device 100 is configured as a digital camera. Although the present disclosure is not limited to image sensors or devices, descriptions of the implementations are made with respect to image sensors.

In the illustrated implementation of FIG. 1, the image capturing device 100 includes a lens 110, an imaging stage 120, an image sensor 130, a timer 140, and a processor 150. The lens 110 receives and focuses the light 102 from a subject scene to form an image on the image sensor 130. The image sensor 130 converts the incident light to an electrical signal for each pixel. In one implementation, the image sensor 130 is a charge-coupled device (CCD) type. In another implementation, the image sensor 130 is an active pixel sensor (APS) type, which is often referred to as a complementary metal oxide semiconductor (CMOS) sensor because of the ability to fabricate them using a CMOS fabrication process.

The imaging stage 120 may include elements such as a neutral density (ND) filter, an iris, a shutter, an exposure controller, a brightness sensor, and/or other units configured to regulate the amount of light reaching the image sensor 130. The iris and the shutter may be configured to regulate the amount of light reaching the image sensor 130 by controlling the aperture and the duration of the shutter opening. The exposure controller may respond to the amount of light available in the scene as metered by the brightness sensor and control other elements including the neutral density (ND) filter, the iris, and/or the shutter. In one implementation, the image sensor 130 is configured with a plurality of sensing elements. The processor 150 processes the signal received from the sensing elements of the image sensor 130 to form an output image 152. In some implementations, the imaging stage 120 includes the lens 110.

In one example, the operation of an image sensor (e.g., an APS) is performed in three steps: a reset step, where the sensor is reset from the previous integration cycle; an image integration step, where the light energy is collected and converted into an electrical signal; and a signal readout step, where the signal is read out.

The image capturing device 100 can be selected to be operated in one of two modes of operation, a normal mode of operation and a saturation mode of operation. The normal mode of operation can be selected if the length of time when any of the image sensor's sensels is saturated to its maximum value is expected to be longer than the length of time when the image sensor is exposed to light (i.e., the integration period or exposure time). The saturation mode of operation can be selected if any sensel's saturation time is expected to be shorter than the exposure time. In one implementation, the mode of operation is set by the processor 150.

In one implementation of the image integration step in a normal mode of operation, light energy, in the form of photons, strikes a photodiode in a sensel, thereby creating a number of electron-hole pairs. The photodiode is designed to limit recombination between the newly-formed electron-hole pairs. Thus, the holes are attracted to the ground terminal of the photodiode, while the electrons are attracted to the positive terminal of the photodiode where each additional electron reduces the voltage on the photodiode. At the end of the integration period, the number of photons that were absorbed by the photodiode during the image integration period can be determined by subtracting the voltage at the end of the integration period from the voltage at the beginning of the integration period. Thus, the sensels measure the number of incoming photons by counting the number of electrons that are displaced via the photoelectric effect and are stored in a capacitor. The charge on the capacitor is measured at the end of the exposure to deduce the original number of incident photons.

The dynamic range of a sensor in a normal mode of operation is determined by the maximum number of photons that the sensor can collect during an integration period, and the minimum number of photons that a sensor can collect during the integration period that can be detected over the noise floor. As stated above, processing images with drastic lighting changes is a challenge for an image capturing device with a limited dynamic range. For example, if the integration period of the sensor is shortened to the point where none of the bright-light information is lost, i.e., where the number of collected photons will not exceed the capacity of the sensor during the integration period, then most, if not all, of the low-light information will be lost (resulting in areas of the image that "get crushed" to black) because there will be so few collected photons that the photons will not be distinguishable over the noise level. In contrast, if the integration period of the sensor is increased to capture the low-light information, i.e., where the number of collected photons is detectable over the noise floor, then a significant portion of the bright-light information is lost (resulting in areas of the image that "get blown out") because the number of collected photons will exceed the capacity of the sensor. Thus, the dynamic range is partly limited by the capacity of the storage device (e.g., the capacitor).

In one implementation, the image integration step in a saturation mode of operation includes performing all of the tasks involved in the normal mode. However, the saturation mode of operation also includes measuring the saturation time of each sensel in the image sensor 130, while the tasks of the normal mode are performed. The saturation time of each sensel in the image sensor 130 is measured and recorded by the timer 140.

In one implementation, in the normal mode of operation, switch 160 is closed by the processor 150 to receive the photon values collected by the sensels of the image sensor 130 during the integration step. In the saturation mode of operation, both switches 160 and 162 are closed by the processor 150. Thus, in this configuration (i.e., both switches 160, 162 closed), the processor 150 receives the photon values collected by the sensel capacitors of the image sensor 130 for those sensels that have not saturated by the end of the exposure time through switch 160. In addition to the receipt of the photon values from the image sensor 130, the processor 150 also directs the timer 140 to start counting from the start of the integration step for each sensel of the image sensor 130. The timer 140 for each sensel stops counting when that sensel has saturated to generate the saturation time. Thus, the timer 140 keeps the saturation time for every sensel of the image sensor 130 and sends them to the processor 150. Once the saturation times for all sensels have been received, the processor 150 replaces the photon values for those sensels that have saturated. The method for calculating the collected photon value for those sensels that have saturated is described in detail below.

In one implementation, the timer 140 includes a plurality of probes, wherein each probe is configured as a counter that measures the saturation time for each sensel of the image sensor 130. Thus, in this implementation, the timer 140 can be configured as a layer of probes that is disposed above the image sensor 130.

In one implementation, the processor 150 processes the data received from the timer 140 to calculate the number of photons that would be incident during the exposure time (i.e., the integration step) of the image sensor 130. This calculation is dependent on the characteristics of the sensor. For example, in the case of an image sensor where the accumulation of electrons is linearly proportional to the number of incident photons, the number of electrons, E, deduced to be captured by a storage unit of a given sensel (assuming an unlimited storage capacity) would be calculated by $E=C*t_e/t_s$, where C is the electron capacity of the sensing element, $t_e$ is the exposure time, and $t_s$ is the saturation time for that sensel. The calculation needs to simulate the amount that the sensor would capture in the full exposure period. Thus, in the case of nonlinear sensors, the function would take the nonlinearity into consideration. In some implementations, a lookup table of numbers is used to simulate the non-linear function.

As mentioned above, the number of electrons that would have been accumulated (assuming the accumulation of electrons is linearly proportional to the number of incident photons) can be calculated from the measured saturation time. For example, assuming the typical fastest shutter speed (i.e., the exposure time) of $1/8000$ of a second, and the measured time to saturation of a sensel to be $1/16000$ of a second, the number of electrons that should have been stored (proportional to the number of incident photons) is equal to $C*(1/8000)/(1/16000)=2C$, which is equal to twice the storage capacity of that sensel. In another example, if the measured time to saturation of the sensel is $1/32000$ of a second, then the number of electrons that should have been stored is equal to $C*(\frac{1}{8000})/(\frac{1}{32000})=4C$, which is equal to four times the storage capacity of that sensel.

The sensels that do not saturate will be treated the same way as a normal sensor. That is, the number of electrons in that sensel is simply counted.

As mentioned above, a modern image sensor, limited by characteristics such as electron capacity and electron readout noise, can detect about 14 stops of dynamic range (i.e., it takes 14 doublings of the smallest recordable value to reach saturation). If the time can be measured accurately enough, by using the measured times to saturation of sensels of an image sensor, many more stops of information beyond saturation can be theoretically recorded. For example, if 10 additional stops of information beyond saturation can be meaningfully recorded (given the resolution of time measured by the timer(s)), say, by being able to measure 1/(1024×8000) of a second), an image-capturing device of this type can provide 1,024 times (=$2^{10}$) the amount of linear information.

Figure 2:
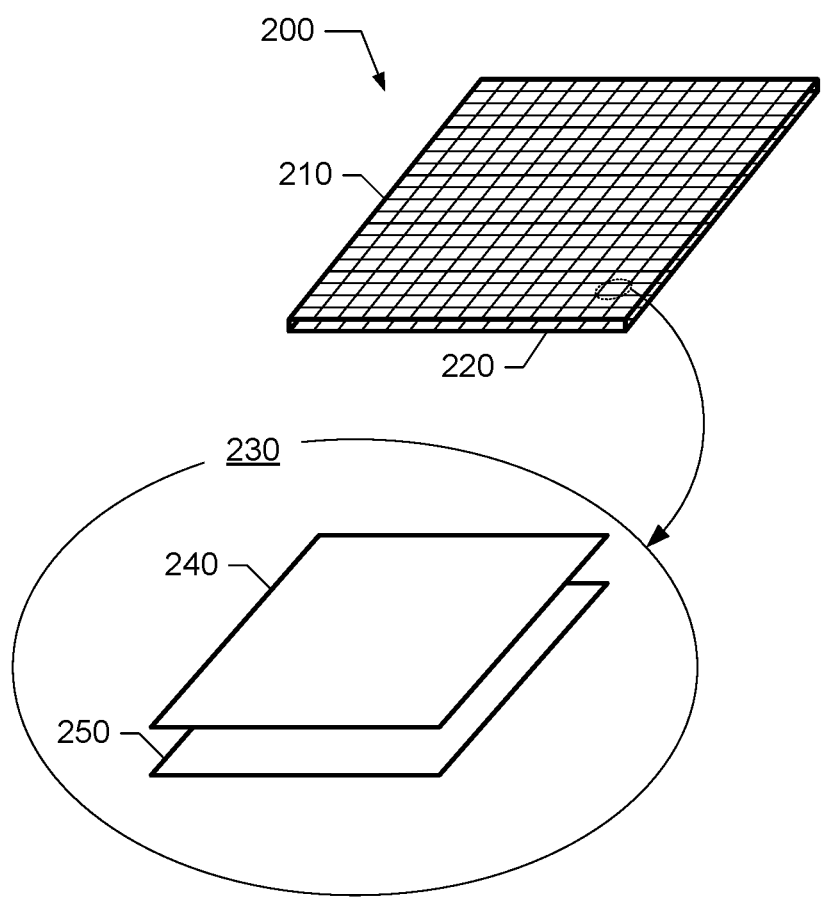
FIG. 2 is a functional diagram of a sensor system that is one implementation of the timer coupled to the image sensor shown in FIG. 1.

FIG. 2 is a functional diagram of a sensor system 200 that is one implementation of the timer 140 coupled to the image sensor 130 shown in FIG. 1. In the illustrated implementation of FIG. 2, the sensor system 200 includes an image sensor 220 having a plurality of sensels and a timer 210 having a plurality of timing elements. FIG. 2 also illustrates an insert 230, which shows a detailed view of a timing element 240 disposed above a sensel 250.

In one implementation, the timing element 240 is configured to measure the saturation time of the sensel 250. In this implementation, the timing element 240 is coupled to the sensel 250 and is configured as a probe to measure the saturation time of the sensel. In another implementation, a timing part of the timing element 240 is built into the sensel 250, while an interface part of the timing element 240 couples to the timing part and acts as means for outputting the saturation time of the sensel 250 received from the timing part.

In yet another implementation, the timing element 240 is configured to measure the time from the saturation of the sensel 250 to the end of the exposure time. In this implementation, the number of electrons captured would be calculated as $E=C*t_e/(t_e-t_{se})$, where $t_{se}$ is the time from the saturation of the sensel to the end of the exposure time.

In yet another implementation, each timing element simply retrieves the time or some count from a common master timing element and records that value for later use, obviating the need for each sensel to have its own dedicated timer.

Figure 3:
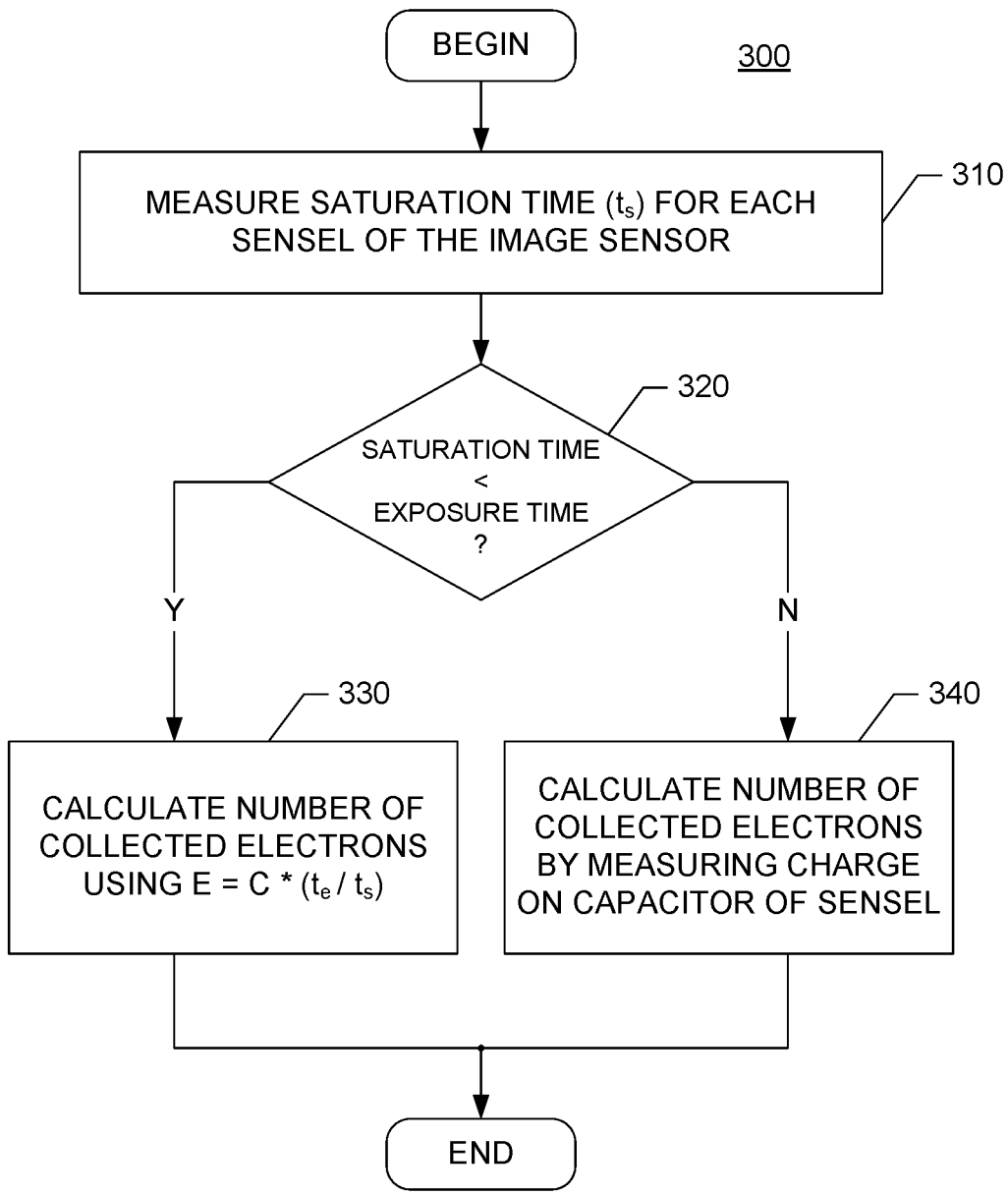
FIG. 3 is a flow diagram illustrating a process for capturing images in accordance with one implementation of the present disclosure.

FIG. 3 is a flow diagram illustrating a process 300 for capturing images in accordance with one implementation of the present disclosure. In the process of capturing images, a saturation mode of operation can be selected if the saturation time of any sensel is expected to be shorter than the exposure time. In the illustrated implementation of FIG. 3, the saturation time for each sensel of an image sensor is measured, at block 310, using a timer which starts at the start of exposure of the image sensor and stops when the sensel is saturated or when the exposure time has elapsed. If it is determined, at block 320, that the saturation time occurred before the end of the exposure time, the theoretical number of collected electrons is calculated, at block 330, as $C*t_e/t_s$, where C is the electron capacity of the sensel, $t_e$ is the exposure time, and $t_s$ is time it took to reach saturation for that sensel. Otherwise, if it is determined, at block 320, that the exposure time is shorter than the saturation time (i.e., the sensel never saturated), the number of collected electrons is calculated, at block 340, by measuring a charge on a capacitor of the sensel. In this case, the charge on the capacitor is measured at the end of the exposure time.

The foregoing methods and apparatus are susceptible to many variations. Additionally, for clear and brief description, many descriptions of the methods and apparatus have been simplified. Many descriptions use terminology and structures of specific standards. However, the disclosed methods and apparatus are more broadly applicable.

Those of skill in the art will appreciate that the various illustrative logical blocks, modules, units, and algorithm steps described in connection with the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The above description of the disclosed implementations is provided to enable any person skilled in the art to make or use the disclosure. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method of capturing an image, comprising:
   receiving an exposure time for an image sensor;
   measuring a time to saturation for each sensel of a plurality of sensels of the image sensor;
   calculating a number of electrons that would have been collected by each sensel with unlimited storage capacity using the time to saturation, the exposure time, and an electron collection capacity of a storage unit of each sensel; and
   processing signals received from the plurality of sensels of the image sensor to form the image.

2. The method of claim 1, wherein calculating the number of electrons that would have been collected by each sensel with unlimited storage capacity comprises
   multiplying the electron collection capacity by the exposure time and dividing by the time to saturation.

3. The method of claim 1, wherein calculating the number of electrons that would have been collected by each sensel with unlimited storage capacity comprises
   using a function that returns a predicted number of electrons given the time to saturation.

4. The method of claim 1, further comprising
generating the image using the number of electrons collected by each sensel.

5. The method of claim 1, wherein measuring the time to saturation for each sensel comprises
using a timer that starts when the image sensor begins exposing and stops when each sensel is saturated or the image sensor is no longer exposed.

6. The method of claim 5, wherein the timer includes a plurality of timing elements.

7. The method of claim 6, further comprising
embedding each timing element into each sensel of the plurality of sensels.

8. The method claim 6, wherein the timer further includes a plurality of interface elements, further comprising
coupling each interface element to each sensel.

9. The method of claim 8, further comprising
receiving a signal at each interface element from each timing element to record the time to saturation.

10. A sensor system, comprising:
an image sensor to sense an image, the image sensor including a plurality of sensels;
a timer including a plurality of timing elements, each timing element coupled to a corresponding sensel of the plurality of sensels,
wherein each timing element measures time to saturation of the corresponding sensel to predict a number of electrons that would have been collected by the corresponding sensel; and
a processor configured to process signals received from the plurality of sensels of the image sensor to form the image.

11. The system of claim 10, wherein each timing element is configured as a probe to compute the time to saturation of the corresponding sensel.

12. The system of claim 10, wherein the timer further includes a plurality of interface elements, each interface element is coupled to each sensel.

13. The system of claim 12, wherein each timing element is built into the corresponding sensel.

14. The system of claim 13, wherein each interface element is configured to receive signal from each timing element to calculate the time to saturation.

15. The system of claim 10, wherein the time to saturation is computed from a count which starts when the corresponding sensel is initially exposed and stops when the corresponding sensel saturates.

16. The system of claim 15, wherein the number of electrons expected to be collected by the corresponding sensel is calculated as an electron collection capacity of a storage unit in the corresponding sensel multiplied by an exposure time of the image, and divided by the time to saturation of the corresponding sensel.

17. The system of claim 15, wherein the number of electrons expected to be collected by the corresponding sensel is calculated using a function that returns a predicted number of electrons given the time to saturation.

18. The system of claim 10, wherein the time to saturation is computed from a count which starts when the corresponding sensel saturates until the corresponding sensel is no longer exposed.

19. The system of claim 18, wherein the number of electrons collected by the corresponding sensel is calculated as an electron collection capacity of a storage unit in the corresponding sensel multiplied by an exposure time of the image and divided by the time to saturation of the corresponding sensel.

20. An image capturing device, comprising:
an imaging stage;
an image sensor coupled to the imaging stage, the image sensor including a plurality of sensels;
a timer including a plurality of timing elements, each timing element coupled to a corresponding sensel of the plurality of sensels; and
a processor coupled to the timer, the processor configured to receive signal from each timing element to measure time to saturation of the corresponding sensel and calculate an expected number of electrons to be collected by the corresponding sensel, the processor further configured to process signals received front the plurality of sensels of the image sensor to form an image.

21. The image capturing device of claim 20, wherein the imaging stage comprises
at least one of a lens, a neutral density filter, an iris, a shutter, an exposure controller, and a brightness sensor.

22. The image capturing device of claim 20, wherein each timing element is configured as a probe to compute the saturation time of the corresponding sensel.

23. The image capturing device of claim 20, wherein the time to saturation is computed from a count which starts when the corresponding sensel is initially exposed and stops when the corresponding sensel saturates.

24. A method of capturing an image, comprising:
receiving an exposure time for an image sensor;
measuring a time to saturation for each sensel of a plurality of sensels of the image sensor; and
calculating a number of electrons that would have been collected by each sensel with unlimited storage capacity using the time to saturation, the exposure time, and an electron collection capacity of a storage unit of each sensel,
wherein calculating the number of electrons that would have been collected by each sensel with unlimited storage capacity comprises
multiplying the electron collection capacity by the exposure time and dividing by the time to saturation.

* * * * *